United States Patent [19]

Griffith, Jr.

[11] Patent Number: 4,805,210

[45] Date of Patent: Feb. 14, 1989

[54] AUTOMATIC TELEPHONE LINE SHARING AND LOCKOUT APPARATUS

[76] Inventor: Herbert L. Griffith, Jr., 303 Boswell Hill Rd., Endicott, N.Y. 13760

[21] Appl. No.: 95,028

[22] Filed: Sep. 10, 1987

[51] Int. Cl.[4] .......................... H04M 1/70; H04M 1/72
[52] U.S. Cl. ..................................... 379/195; 379/161; 379/184; 379/394
[58] Field of Search ............... 379/194, 195, 161, 184, 379/93, 394, 373

[56] References Cited

U.S. PATENT DOCUMENTS 4,000,375  12/1976  Kawamura .......................... 379/184

FOREIGN PATENT DOCUMENTS 1961015  6/1978  Fed. Rep. of Germany ...... 379/195
3504046  8/1986  Fed. Rep. of Germany ...... 379/194
0154202  12/1979  Japan .................................... 379/184
0053950  4/1980  Japan .................................... 379/184

Primary Examiner—Thomas W. Brown
Attorney, Agent, or Firm—Joseph E. Funk

[57] ABSTRACT

Automatic telephone line sharing apparatus is disclosed that will only allow one telephone set or other communication device to be connected to a shared telephone line at a time. Circuits in the apparatus sense when a first one of a plurality of telephone sets or other communication devices is connected to a shared line and causes switches to be operated disconnecting the other telephone sets and devices from the line. When the first set or device disconnects from the shared line, this is sensed and the other sets or devices are automatically reconnected to the shared line. This automatic operation insures exclusive line use by blocking line access by other telephone sets or devices sharing the common telephone line.

7 Claims, 2 Drawing Sheets

AUTOMATIC TELEPHONE LINE SHARING AND LOCKOUT APPARATUS

FIELD OF THE INVENTION

This invention relates to telephone line sharing apparatus, and more particularly to automatic telephone line sharing apparatus that will only allow one telephone set or other communication device to be connected to a shared telephone line at a time. This automatic operation insures exclusive line use by blocking line access by other telephone sets or devices sharing the common telephone line.

BACKGROUND OF THE INVENTION

In the prior art there has always been a need for telephone line sharing apparatus that permits a device to share a telephone line of a key telephone system or PBX instead of installing a separate line for such a device. This has been most desireable for small businesses that only have a few telephone sets, but do not want to have more than one telephone line and that do not want the cost of installing a small key system or PBX. To accomplish this end for small businesses, typically a manually operated key or switch apparatus is provided. When it is desired to provide exclusive access to a shared telephone line for a device, a key or switch is operated and such access is had. This access may be had whether originating or receiving a call. When the call is completed the key or switch connected to the device must be released. Problems arise, however, when someone forgets to release the lockout key after completing a call. Others wishing to gain access to the shared telephone line must find the unreleased lockout key or switch before being able to place a call.

The need for exclusive access to a telephone line has become more important in this day of computers, facsimile machines and point of sale machines (credit card machines). The computers are typically small computers known as personal computers and are widely used. They are connected to the telephone line via a modem for called up access to another computer also equipped with a modem. When a computer is connected to a line via a modem and data is being transmitted over the telephone line between the computers, any disturbance on the telephone line can damage the transmitted data and thereby make it unusable. Retransmission of the data is then required. Such disturbances are often caused by a call waiting tone on the telephone line, and by another telephone set or device connected to the shared line being taken off hook while data transmission is taking place. A more dangerous problem is thereby created because the transmitted data or programs being sent or received over the telephone line are damaged without knowledge of the damage, and the damage is not discovered until the damaged data or programs are used and cause further problems. This problem has been partially solved in that the telephone companies now provide the ability to temporarily disable the call waiting feature by keying certain digits prior to originating a call. This is called "selective call waiting" and the call waiting feature is temporarily disabled for a single call, and is automatically reenabled thereafter. Disabling the "call waiting" feature for a telephone call is typically done by keying *70 on a touch tone dial telephone set, or by keying 1170 on a rotary dial telephone set prior to dialing a telephone number. The selective call waiting may also be used with a three way call feature provided by the telephone company.

However, the problem of interrupting a data call between computers by inadvertently taking another telephone set or communication device off hook still exists. The transmitted data or programs are still damaged. The only solution has been the manual key lockout equipment which causes other problems as described above.

Thus, there is a need in the art for lockout apparatus that can automatically provide exclusive, private access to a shared telephone line, and which will automatically restore shared access to the telephone line when a call is terminated.

SUMMARY OF THE INVENTION

The above described problem in the prior art is solved by the present invention which provides lockout apparatus that automatically provides exclusive, private access to a shared telephone line. This apparatus senses when a telephone set or device is taken off hook or turned on to either originate a telephone call, or to answer same. The apparatus then prevents or locks out any other telephone set or communication device connected to a shared telephone line from being connected to the same line until the first call is terminated. When a telephone set or communication device that has gained exclusive access to a shared telephone line goes on hook, the exclusive access is automatically terminated by the novel lockout apparatus and other telephone sets or communication devices connected to the shared line may then gain exclusive access to the telephone line.

The novel lockout apparatus is contained in a small box that is connected in between the telephone line and all telephone sets and/or communication devices sharing a common telephone line. In addition, the novel lockout apparatus uses very little power and is powered from the central office over the telephone line so there are no batteries to periodically replace. The lockout apparatus senses when a first one of any of the telephone sets or communication devices sharing a line goes off hook, allows that telephone set or device to be connected to the telephone line, and automatically operates switches that open up the connection between the other telephone sets or devices and the telephone line. It doesn't matter whether the telephone set or device that gained access to the telephone line is originating or answering a telephone call. When the telephone set or device that has gained access to the telephone line is hung up, the switches for the other telephone sets or devices are all released, thereby permitting all the telephone sets or devices to thereafter again gain access to the shared telephone line on a first come, first serve basis.

DESCRIPTION OF THE DRAWING

The invention will be better understood upon reading the following detailed description in conjunction with the drawing in which.

DETAILED DESCRIPTION

Figure 1:
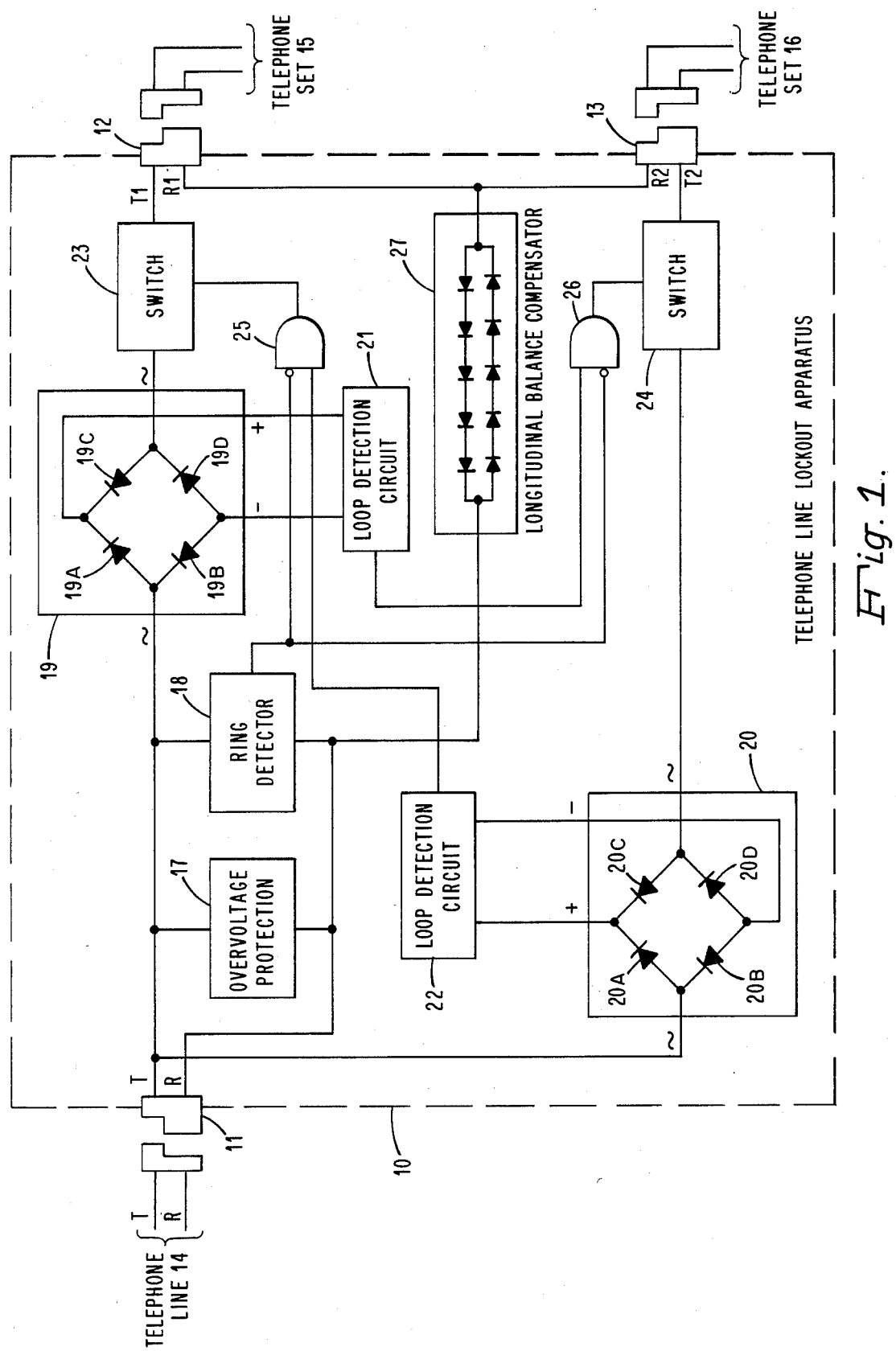
FIG. 1 is a block diagram schematic of the novel automatic telephone line sharing and lockout apparatus.

In FIG. 1 is shown the detailed block diagram of the novel lockout apparatus 10 taught and claimed herein. The preferred embodiment of lockout apparatus 10 shown and described herein provides shared access to a common telephone line by two telephone sets or other communication devices. However, using the teaching herein those skilled in the art may easily modify the lockout apparatus to provide shared access by any number of telephone sets or devices. In addition, two units of lockout apparatus 10 may be connected in tandem as described further in this specification with reference to FIG. 2 to provide shared access to three telephone sets and/or communication devices. For each additional telephone set or device, an additional unit of lockout apparatus 10 must be connected in tandem. There are three standard telephone jacks (RS11) 11, 12 and 13 mounted in the wall of lockout apparatus 10, and the apparatus is mounted in between a telephone line 14 and telephone sets or devices 15 and 16 that share access to telephone line 14. In the embodiment of the invention shown in FIGS. 1 and 2 only telephone sets are shown for ease of representation, but any combination of telephone sets or other communication devices may be connected to lockout apparatus 10. Jack 11 is used to connect lockout apparatus 10 to telephone line 14, telephone set or device 15 is plugged into jack 12, and telephone set or device 16 is plugged into jack 13.

The circuitry within apparatus 10 uses DC power from the telephone central office forty-eight volt power supply which is normally found on telephone line 14. This voltage is negative forty-eight volts on the ring lead "R", and ground potential on the tip lead "T" as is known in the art.

Internal to lockout apparatus 10 and connected across the T and R leads of jack 11 is an overvoltage protection circuit 17 which comprises a bilateral zener diode. Circuit 17 being bilateral, the polarity of an excessive voltage on telephone line 14 doesn't matter. When the voltage on telephone line 14 exceeds safe levels defined by the conduction level of circuit 17, circuit 17 conducts and thereby protects the circuitry in lockout apparatus 10 while also protecting users of telephone sets or devices 15 and 16. Overvoltage protection circuit 17 has a high impedance when it is not conducting so does not load down telephone line 14 and thereby interfere with calls.

Ring detector 18 is also connected across leads T and R inside lockout apparatus 10 to detect the presence of ring voltage on telephone line 14 from the central office. It is also a high impedance device that does not normally conduct and load down telephone line 14, but it does conduct at the higher ring voltage levels placed on telephone line 14 and provides an output indicating the presence of ringing voltage. At the same time detector 18 does not inhibit the ring voltage from passing through lockout apparatus 10 to be applied to and ring telephone sets or devices 15 and 16. Ring detector 18 has an output 28 which is normally low, but which goes high for each pulse of ringing voltage on telephone line 14.

There are two full wave bridge rectifiers 19 and 20 that are respectively connected in series with tip leads T1 and T2 of telephone jacks 12 and 13 before they join at tip lead T. Rectifiers 19 and 20 are connected as shown in FIG. 1 and provide a bidirectional path for both ringing and talking signals, while at the same time providing a DC voltage indicating when a telephone set is off-hook across the telephone line. The current flow through the diodes of rectifiers 19 and 20 is described in greater detail further in this specification, but there is a small voltage drop across diodes internal to the loop detection circuit indicating the presence of loop current. The small voltage drop is detected by loop detection circuit 21. More particularly, when only telephone set or device 15 is off-hook, there is a loop current flowing through same due to the forty-eight volts on telephone line 14, and this loop current is detected at the central office in a manner well known in the art and is used as indication that telephone set or device 15 wants to originate a call, or wants to answer a call when ringing voltage has been applied to line 14. The operation is the same if telephone set or device 16 alone goes off-hook, but with respect to diode bridge rectifier 20 and loop detection circuit 22.

Connected to full wave bridge rectifier 19 is a loop detection circuit 21 which is connected to the DC output leads of rectifier 19. When telephone set or device 15 is off-hook there is a loop current flowing through telephone set or device 15 which causes loop current to flow out of the positive output lead of bridge rectifier 19. Loop detection circuit 21 has its two input leads connected to the plus and minus output leads of bridge rectifier 19 and senses the positive loop current output therefrom only when telephone set or device 15 is off-hook and is connected to telephone line 14 by apparatus 10. Similarly, connected to the DC output leads of full wave bridge rectifier 20 is a loop detection circuit 22 which senses when telephone set or device 16 alone is off-hook and is connected to telephone line 14 by apparatus 10. The operation of loop detection circuits 21 and 22 as part of the overall operation of apparatus 10 is described in detail further in this specification.

Connected in series with full wave bridge rectifier 19 and tip lead T1 is a switch 23. Similarly, connected in series with full wave bridge rectifier 20 and tip lead T2 is a switch 24. Switches 23 and 24 are solid state switches that are both normally closed. Being normally closed switches, when a call is received the ringing signal will be applied to both telephone sets or devices 15 and 16. However, the first of telephone sets or devices 15 and 16 to answer an incoming call will have its switch remain closed, but the other of these two telephone sets or devices will have its associated switch automatically opened to give the exclusive line access provided by telephone line lockout apparatus 10. When a call is originated by one of telephone sets or devices 15 or 16 its associated normally closed switch stays unoperated, thereby keeping that telephone set connected to telephone line 14. However, the switch associated with the other on-hook telephone set is automatically operated and prevents connection of the on-hook telephone set to the telephone line. This thereby provides the private telephone line connection to the off-hook one of the two telephone sets. The control of switches 23 and 24 is described starting in the next paragraph.

In FIG. 1 are shown AND gates 25 and 26 which perform a logical AND function. One skilled in the art may implement this AND logic function in many ways and AND gates are shown for ease of understanding the operation of lockout apparatus 10. AND gate 25 is used to energize switch 23 to open the normally closed contact therein, and AND gate 26 is used to energize switch 24 to open the normally closed contact therein. Gates 25 and 26 each have one inverting input and one non-inverting input as shown. The inverting input of both gates 25 and 26 is connected to the output of ring detector 18. The output of ring detector 18 is low when there is no ringing voltage present and, being applied to the inverting inputs of both gates 25 and 26, these inputs of gates 25 and 26 are normally high. The non-inverting input of AND gate 25 is connected to the output of loop detection circuit 22, and the non-inverting input of AND gate 26 is connected to the output of loop detection circuit 21. These gates 25 and 26 function to control their associated switches 23 or 24 to permit only one of telephone sets or devices 15 or 16 to be connected to telephone line 14 at a time. In this manner exclusive use is automatically provided. However, when a one of telephone sets or devices 15 or 16 that has gained access via apparatus 10 to telephone line 14 to initiate or answer a call goes on-hook, the switch 23 or 24 for the other telephone set or device is released and is again normally closed. Again, one of either telephone sets or devices 15 or 16 can gain exclusive access to telephone line 14 and the other one of the two telephone sets or devices is locked out. The operation is first-come, first-served.

Ring leads R1 and R2 which are tied together as shown and connected between them and telephone line ring lead R there is a longitudinal balance compensator 27. Compensator 27 consists of two parallel strings of series connected diodes, as shown in FIG. 1, with each string having five series diodes. The parallel strings are poled oppositely to assure bilateral current conduction, and compensator 27 introduces in the ring lead R the same amount of impedance introduced in the tip lead T by the full wave bridge rectifiers 19 and 20 and the other circuits connected thereto. The function of such compensators is well known in the art.

In operation, initially telephone line 14 is not in use and telephone sets or devices 15 and 16 are both on-hook. Assuming that telephone set or device 15 is taken off-hook to originate a call, there is a loop closure across line leads T and R as previously described. Loop current flows from ground potential on tip lead T, through diode 19A, an input impedance (not shown) of loop detection circuit 21, diode 19D, switch 23, telephone set or device 15, and the forward biased diodes of longitudinal balance compensator 27 to ring lead R of telephone line 14. This loop current develops a small voltage drop across the input impedance of loop detection circuit 21 which is detected therein. Responsive thereto circuit 21 provides a logical high output signal as one input to AND gate 26. Because there is no ringing signal there is a logical low signal output from ring detector 18 and, accordingly, the second inverting input of AND gate 26 is high. The output of AND gate 26 thereby goes from low to high and switch 24 is operated thereby opening its normally closed contact. The tip T2 lead of telephone set or device 16 is thereby opened and telephone set or device 16 cannot be connected to telephone line 14 as long as telephone set or device 15 remains off-hook. At the same time, the noninverting input to AND gate 25 remains at a logical low and the output of gate 25 thereby remains low as is understood in the art. Accordingly, switch 23 is not operated and its normally closed contact remains closed, keeping telephone set or device 15 connected to line 14. Alternating current touch tone signals generated at telephone set or device 15 pass through bridge rectifier 19 and compensator 27 due to their bidirectional conducting characteristic. After a connection is established through the central office to a called telephone station, alternating current talking signals and/or data signals will also pass through rectifier 19 and compensator 27.

When telephone set or device 15 goes on-hook at the end of the telephone call, loop detection circuit 21 senses the cease of the loop current and causes the non-inverting input of AND gate 26 to go low. Accordingly, the output of gate 26 goes low and switch 24 is automatically released to its normally closed state. At this time either telephone set or devices 15 or 16 may again go off-hook to originate a call as described in the last paragraph.

In the case where the central office applies ringing voltage to telephone line 14 to indicate a call is being placed thereto in a manner well known in the art, both switches 23 and 24 are unoperated and the ringing voltage is applied to both telephone sets or devices 15 and 16 to ring same. The ringing voltage is also alternating as is known and passes through bidirectional rectifiers 19 and 20, and compensator 27. As described previously, each pulse of the ringing voltage is detected by ring detector 18. While each ringing pulse is present on telephone line 14 the output from detector 18 is logically high. The logical high is inverted by the inverting inputs of both AND gates 25 and 26 to a logical low state and, accordingly, the output of AND gates 25 and 26 must remain low as long as each pulse of ringing voltage is present on telephone line 14. The result is that if one of telephone sets or devices 15 or 16 goes off-hook to answer the call, the switch 23 or 24 associated with the telephone line 15 or 16 that doesn't go off-hook will not be operated until just after the end of the pulse of ringing voltage. This is done to protect solid state switches 23 and 24 from damage due to high voltage inductive surges caused if switches open while ringing voltage is present on telephone line 14. In between ringing voltage pulses the inverting inputs of AND gates 25 and 26 go logically high, the output of the one of these two AND gates that has not answered the call will go logically high and the associated switch will be operated. Thus, the one of telephone sets or devices 15 or 16 that did not go off-hook to answer the call has its tip lead T- opened and it is thereby prevented from going electrically off-hook and being connected to telephone line 14. Exclusive use of the off-hook answering telephone set or device is maintained. Of course, the second telephone set or device may be physically taken off-hook, say to try to late answer the call or to originate a call, but it is not connected to anything. Nothing will be heard. When the one of telephone sets or devices 15 or 16 which was used to answer the incoming call subsequently goes on-hook, the switch associated with the other telephone set or device is released and that other telephone set or device can again access telephone line 14 as previously described.

Figure 2:
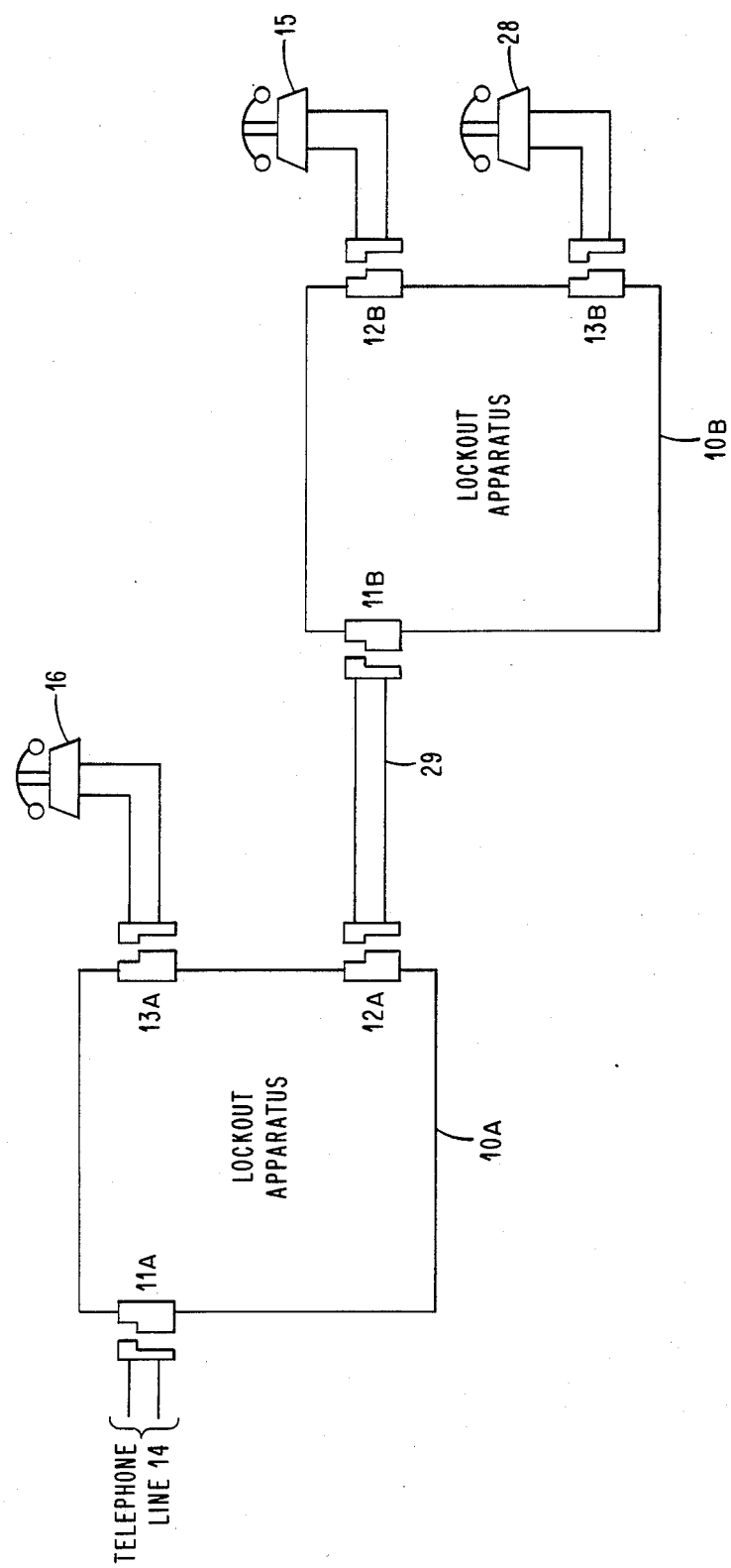
FIG. 2 is a simplified block diagram showing two automatic telephone line sharing and lockout apparatus connected in tandem to provide shared access for three telephone sets or other communication devices.

In FIG. 2 is shown a simplified block diagram showing two automatic telephone line sharing and lockout apparatus 10A and 10B connected in tandem to provide shared access for three telephone sets or devices 15, 16 and 28. When it is desired to provide shared access to a third telephone set or device 28, a second lockout apparatus 10B is provided and is connected to the first lockout apparatus 10A as shown. Jack 12A is not connected to telephone set or device 16 as shown in FIG. 1 but, instead, is connected to telephone line jack 11B of lockout apparatus 10B. This is done with a standard double ended telephone extension cord 29. Telephone set or device 16 is still connected to jack 13A, but telephone set or device 15 is connected to jack 12B of apparatus 10B instead. The third telephone set or device 28 is connected to jack 13B. The operation of each of automatic telephone line sharing and lockout apparatus 10A and 10B is the same as previously described. Though not shown, additional automatic telephone line sharing and lockout apparatus may be connected in tandem, as shown in FIG. 2, to provide shared operation for additional telephone sets or devices. One apparatus 10 is provided for each additional telephone set or device.

While what has been described hereinabove is the preferred embodiment of the invention, those skilled in the art may make many changes without departing from the spirit and scope of the invention. For example, the circuit disclosed in apparatus 10 may be modified to provide shared access to more than two telephone sets or other communication devices without departing from the spirit and scope of the invention. For example, the switches that open the lines through the lockout apparatus to provide exclusive access may be located elsewhere in the circuitry closer to the input jack.

What is claimed is:

1. Automatic telephone line lockout apparatus for providing exclusive access by ones of a plurality of communication devices to a telephone line, said lockout apparatus comprising:
    a first sensing means connected to sense when a first one of said plurality of communication device goes off-hook;
    a second sensing means connected to sense when a second one of said plurality of communication devices goes off-hook;
    a first switch means for connecting said first communication device to said telephone line, said first switch means being under control of said second sensing means to disconnect said first communication device so it cannot go off-hook and be connected to said telephone line only while said second communication device is off-hook and is connected to said telephone line;
    a second switch means for connecting said second communication device to said telephone line, said second switch means being under control of said first sensing means to disconnect said second communication device so it cannot go off-hook and be connected to said telephone line only while said first communication device is off-hook and is connected to said telephone line; and
    ring detecting means for sensing the presence of ringing on said telephone line, said first and said second sensing means being responsive to said ring detecting means to not be able to control said first and said second switch means to disconnect said first or said second communication devices from said telephone line only while pulses of ringing voltage are present on said telephone line.

2. The invention in accordance with claim 1 wherein a loop current passes through the one of said first and said second communication devices that is off-hook and is connected to said telephone line, and said first sensing means comprises:
    a first bridge rectifier having AC inputs and DC outputs and said first rectifier is connected between said telephone line and said first communication device, and said loop current flows through said first bridge rectifier when said first communication device is off-hook while said second communication device is on-hook; and
    first loop detection means connected to the DC outputs of said first bridge rectifier, said first loop detection means sensing the presence of said loop current flowing through said first bridge rectifier and said first communication device, said first loop detection means also controlling said second switch means to operate said second switch means and disconnect said second communication device from said telephone line only while said first communication device is off-hook and is connected to said telephone line.

3. The invention in accordance with claim 2 further comprising:
    first gating means responsive to said second sensing means and to said ring detecting means to operate said first switch means and thereby disconnect said first communication device from said telephone line only while said second communication device is off-hook and is connected to said telephone line.

4. The invention in accordance with claim 3 wherein said telephone line has first and second leads and said series connected first bridge rectifier and said first switch means are connected in series with said first lead, and further comprising:
    longitudinal balance compensator means connected in series with said second lead to balance the impedance connected in series with said first lead.

5. The invention in accordance with claim 4 wherein said second sensing means comprises:
    a second bridge rectifier having AC inputs and DC outputs and said second rectifier is connected between said telephone line and said second communication device, and said loop current flows through said second bridge rectifier when said second communication device is off-hook while said first communication device is on-hook; and
    second loop detection means connected to the DC outputs of said second bridge rectifier, said second loop detection means sensing the presence of said loop current flowing through said second bridge rectifier and said second communication device, said second loop detection means also controlling said first switch means to operate said first switch means and disconnect said first communication device from said telephone line only while said second communication device is off-hook and is connected to said telephone line.

6. The invention in accordance with claim 5 further comprising:
    second gating means responsive to said first sensing means and to said ring detecting means to operate said second switch means and thereby disconnect said second communication device from said telephone line only while said first communication device is off-hook and is connected to said telephone line.

7. A method for providing exclusive access by one of a plurality of communication devices to a telephone line on which connection of one of said devices is detected as a loop current, said method comprising the steps of:
    sensing when a first one of said plurality of communication devices connects to said telephone line by sensing said loop current flowing through said first device;
    opening paths to the others of said plurality of communication devices through which paths said other devices can be connected to said telephone line, said paths being opened upon the sensing that said first device is connected to said first telephone line;
sensing when said first device disconnects from said telephone line by sensing the absence of said loop current flowing through said first device;
closing said paths to the others of said plurality of communication devices when it is sensed that said first device has disconnected from said telephone line;
sensing the presence of ringing on said telephone line; and
preventing the opening of said paths to said other devices while ringing is present on said telephone line.

* * * * *